United States Patent
Andersen

[11] 3,774,104
[45] Nov. 20, 1973

[54] LIQUID CONDUCTIVITY MEASURING APPARATUS

[75] Inventor: Marinus Leland Andersen, Ames, Iowa

[73] Assignee: Hach Chemical Company, Ames, Iowa

[22] Filed: Dec. 13, 1971

[21] Appl. No.: 207,297

[52] U.S. Cl. ............................................... 324/30 B
[51] Int. Cl. ........................ G01r 27/24, G01n 27/06
[58] Field of Search .................. 324/29, 30 R, 30 B, 324/62, 65

[56] References Cited
UNITED STATES PATENTS

| | | | |
|---|---|---|---|
| 2,769,140 | 10/1956 | Obenshain | 324/30 B |
| 2,780,773 | 2/1957 | Channon | 324/30 B |
| 3,358,223 | 12/1967 | Birnstingl | 324/30 B |

Primary Examiner—Rudolph V. Rolinec
Assistant Examiner—Rolf Hille
Attorney—C. Frederick Leydig et al.

[57] ABSTRACT

Apparatus for measuring the conductivity of a liquid including an improved probe adapted for confining conduction between a pair of electrodes to a predetermined path and for housing temperature compensation elements in thermal proximity to the liquid. The probe incorporates an insulating element being characterized in that it defines the boundaries of a pair of channels between the electrodes in which all electrical conduction through the liquid takes place. The insulating element additionally defines input conduits for entry of the liquid into the channels as the probe is immersed into the liquid and exit conduits from which the air displaced from the channel can escape, the input and exit conduits intersecting the channels at points of equal potential with respect to the potential at either electrode so that conduction through these conduits to the external environment is prevented.

7 Claims, 4 Drawing Figures

PATENTED NOV 20 1973
3,774,104
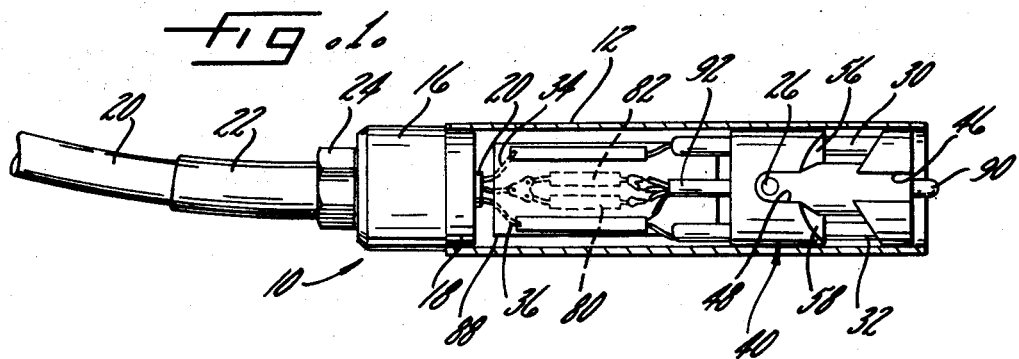
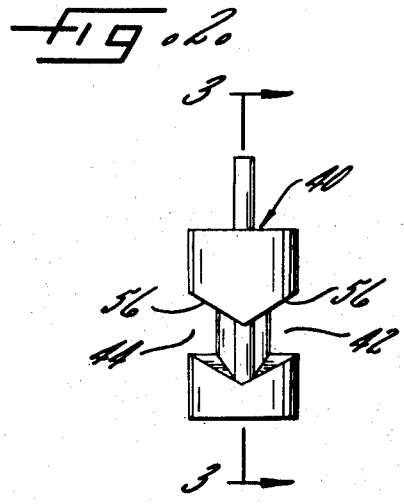
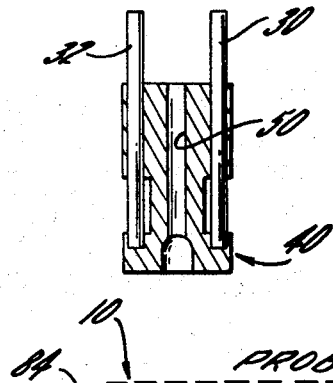
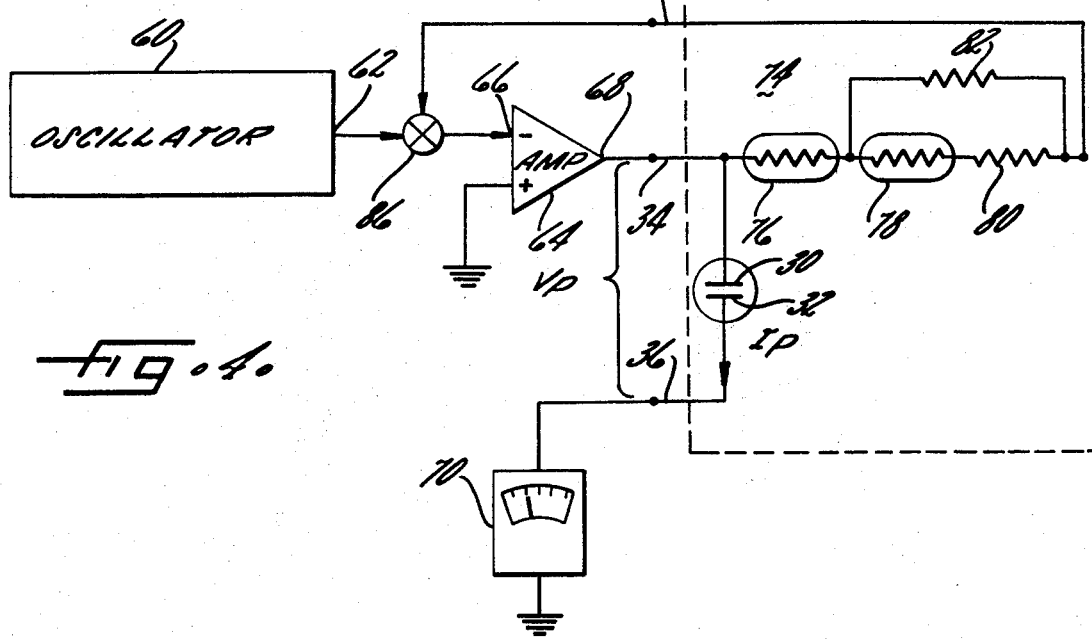

LIQUID CONDUCTIVITY MEASURING APPARATUS

DESCRIPTION OF THE INVENTION

This invention relates generally to instruments for measuring the electrical conductivity of a liquid and more particularly concerns an improved probe for use with electrical conductivity measuring instruments.

The conductivity of a liquid, or alernatively, the resistivity of a liquid, is the most direct measure of the ionic content of that liquid. Thus the conductivity or resistivity is often used as a measure of the purity of water, in determining the size and interactions of ions in a solution, in determining the type and concentration of ions present in the solution, and in determining the equilibrium constant of the solution.

Conventional conductivity measuring equipment utilizes a probe having two or more electrodes extending into contact with the liquid of interest. The electrodes are maintained at a potential difference with respect to each other so that current is induced to flow through the liquid in the area of the electrodes. The amount of current flowing from the electrodes to the external circuit is measured to provide an indication of the conductivity of the liquid. However, the current flow between the electrodes is usually sensitive to obstruction or interference, and the conductivity measured with conventional probes has been found to vary for a given liquid when the probe is brought into proximity with the liquid container or any foreign object within the liquid. If the external object is a conductor, an alternate path for current will be established in deference to conduction solely through the liquid. If the external object is non-conductive, it may nevertheless interfere with the shape and extent of the conduction region between the electrodes.

The conductivity measuring apparatus of the present invention is designed to overcome the aforementioned problem. Specifically it is an object of the present invention to provide a conductivity probe in which the conduction paths between a pair of electrodes is confined to a fixed volume of the liquid which is protected from interference with and obstruction by objects external to the probe.

Since it is desirable in any probe to provide for rapid entry of the liquid into the area between the electrodes upon immersion into the liquid and rapid exit of the air displaced from between the electrodes, the probe of the present invention provides ports for this entry and exit from the conduction area. In conventional probes, however, the provision of such ports exposes the conduction path to interference from external electrical forces acting through the entry and exit ports.

It is therefore another object of the present invention to provide for rapid entry and exit of liquid and air respectively to and from the conduction path while at the same time confining conduction to a predefined path.

It is a further object of the present invention to provide a probe allowing continuous flow of liquid into and out of the conduction channel while confining conduction to a predefined path. It is a related object to provide a measuring circuit particularly suitable for use with such a probe.

Another object is the provision in such a probe of a temperature compensation network, which, when used in conjunction with the associated measuring circuit, provides for constant performance characteristics irrespective of the temperature of the liquid.

Other objects and advantages of the present invention will become apparent upon reading the following detailed description and upon reference to the drawings, in which:

FIG. 1 is a partial section of a probe constructed in accordance with the present invention.

FIG. 2 is an elevation of a part of the probe shown in FIG. 1.

FIG. 3 is a cross-section taken along lines 3-3 of the structure shown in FIG. 2

FIG. 4 is a schematic, partially in block form, of the conductivity measuring apparatus of the present invention.

While the invention has been described in connection with a preferred embodiment, it will be understood that I do not intend to limit the invention to that embodiment, but on the contrary, I intend to cover all alternatives, modifications and equivalents as may be included within the spirit and scope of the invention.

Turning first to FIG. 1, there is shown a probe 10 having a cylindrical case 12 and a plug 16 having a portion 18 extending into and sealing the upper end of the case 12. The plug 16 has a hole running axially through it for receiving an electrical conduit 20 which connects the internal elements of the probe to the associated monitoring circuit external to the probe. A water-tight rubber shield 22 surrounds the conduit 20 external to the probe housing and is secured to the plug 16 by a nut 24. The case 12 is a nonconducting material, preferably water-resistant plastic, with a hole 26 in each side to allow for the escape of air in a manner hereinafter described.

For establishing a potential difference within the probe 10, there is provided a pair of electrodes 30, 32 connected to the external circuit via a pair of leads 34, 36 respectively extending through the electrical conduit 20. The electrodes 30, 32 may typically be made of tungsten or any other non-corroding conductor. The external circuit regulates the voltage between the electrodes in a manner hereinafter described.

In accordance with the present invention there is provided within the case 12 an insulating block 40 for holding the electrodes 30, 32 in spaced-apart relationship to each other while confining conduction between the electrodes to a predetermined closed path through the liquid. Accordingly, the insulating block 40, generally of a solid cylindrical configuration to fit snugly when pressed into the case 12, has cut-away portions 42, 44 in its periphery (see FIG. 2) which, when filled with the subject liquid, create a pair of conduction paths between the electrodes 30, 32. An additional cut-away portion runs axially along each side of the insulating block 40 and defines an entry conduit 46 for allowing liquid into the channel upon immersion of the probe into the liquid and an exit conduit 48 for allowing air to escape from the conduction channel through the holes 26 as it is displaced upon entry of the liquid. Finally, the insulating block 40 has a pair of holes running partially therethrough diametrically spaced from each other for receiving the electrodes 30, 32 and holding them in spaced-apart relation at opposite ends of the channels 42, 44. As shown, an additional hole 50 is cut axially through the center of the block 40 in the manner shown in the cross sectional view of FIG. 3 to provide a housing for temperature sensing elements to be later described.

From an electrical standpoint, it is seen that upon immersion of the probe 10 into the liquid a pair of parallel resistant paths are established through the liquid in the channels 42, 44 between the electrodes 30, 32. This circuit, by itself would be electrically protected from interference from external forces were it not for the requirement that the conduction channels 42, 44 must have access ports to the liquid. It is an important feature of the present invention, therefore, that the entry and exit conduits 46, 48 intersect the conduction channel in such a manner that they do not interfere with the current paths through the liquid. This feature is provided by insuring that the conduits 46, 48 into and out of the channels 42, 44 intersect the channels at the same electrical potential with respect to the potential at the electrodes. In other words, each entry or exit conduit is spaced from a given electrode, the electrode 30 for example, by the same distance as is each other entry and exit conduit spaced from that electrode. With this configuration no current will flow from one conduit to another through the liquid external to the probe and the electrical characteristics of any such external path will have no effect on the conduction within the channels 42, 44.

In the preferred embodiment, as has been pointed out, entry conduits 46 and exit conduits 48 are formed along diametrically opposite sides of the insulating block 40 in a plane at 90° to the plane of the electrodes. As such, a continually balanced resistance bridge circuit is formed between the electrode 30, 32 with an electrical null across the midpoints of the parallel resistances between the electrodes, which midpoints are the point of entry and exit for fluid into the channels 42, 44. Thus no conduction occurs in the external liquid.

In accordance with another feature of the present invention, the upper surfaces 56, 58 of the channels 42, 44 are sloped upward towards the exit conduit 48 to facilitate the escape of air from the channels as the probe is inserted into the liquid. That is, as the channels 42, 44 accept the liquid flowing up through the entry conduit 46, the air previously in the channel is allowed to flow smoothly upward and out through the conduits 48 as a result of the upward slope of the upper surfaces 56 and 58 of the channel.

In FIG. 4 the probe 10 and its electrodes 30, 32 are connected by the leads 34, 36 to an external circuit. The external circuit includes an oscillator 60 for producing an a-c. sinusoidal or square wave voltage signal of a predetermined constant amplitude at an output 62. An operational amplifier 64 referenced to ground potential receives the oscillator signal at its inverting input terminal 66 and provides an output signal at a terminal 68 for connection to the lead 34 from the probe. The output 68 from the amplifier 34 establishes the potential difference between the electrodes 30, 32 of the probe. The lead 36 connects the electrode 32 of the probe to ground through a current meter 70 which is calibrated to provide a measure of the current $I_p$ between the electrodes 30, 32, and hence a measure of the conductivity of the liquid being analyzed. Since an ideal current meter appears as a short to its external circuit, the voltage $V_p$ across the leads 34, 36 is governed solely by the output of the amplifier 64.

Where economy is desired, the voltage at the output terminal 68 of the amplifier 64 may be fixed by merely inserting a resistor in the feedback path around the amplifier so as to establish a predetermined amplifier gain and hence a fixed voltage $V_p$. However, in most instances it is desirable to have a measure of conductivity which is independent of the temperature of the liquid. In this regard, it is a further feature of the present invention that a temperature compensation network 74 is provided which is operatively associated with the electrodes 30, 32 and which, in connection with the external circuit, makes conduction between the electrodes independent of the temperature of the liquid. The network 74 includes a pair of thermistors 76, 78 and a fixed resistor 80 connected in series, with a second fixed resistor 82 paralleling the resistor 80 and the thermistor 78. The network 74 is connected from the electrode 30 and the output lead 34 of the probe to an output lead 84 which runs to a summing network 86 at the input of the amplifier 64. As such, the network 74 provides degenerative feedback around the amplifier 64. The effect of having a temperature compensation network 74 in the feedback path of the amplifier 64 is to vary the gain of the amplifier 64 as a function of the temperature of the liquid. As the temperature, and hence the current-carrying capabilities, of the liquid increases, the resistance of the thermistors 76, 78 decreases to increase the degenerative feedback and decrease the gain of the amplifier 64. The voltage $V_p$ across the electrodes 30, 32 decreases so that the measured current $I_p$ remains the same. While a rather simple temperature compensation network 74 is shown, it will be understood that any number of possible networks may be employed in accordance with the degree of accuracy and the closeness of "tracking" desired. The advantage of having the network 74 in the feedback path for the amplifier 64 is that temperature independence is achieved for most liquids at all temperatures. With the feedback compensation used in the present invention the current through the electrodes 30, 32 is the a-c. voltage $V_p$ divided by the resistance of the liquid. Since voltage across and resistance between the electrodes 30, 32 vary in the same manner with temperature in this configuration, the current $I_p$ is constant for a given concentration of ions in the liquid and is proportional to the conductance of the liquid.

In the preferred embodiment the temperature compensation network 74 is contained entirely within the probe 10, the fixed resistors 80 and 82 being mounted on a small printed circuit board 88 and the thermistors 76, 78 being brought into thermal proximity with the liquid through a tube 92 extending through the conduit 50 into contact with the water at the lower end of the probe. The tube 92 is sealed at the lower end and the thermistor elements are preferably held at the lower end with a heat conductive adhesive.

From the foregoing it will be apparent that there has been brought to the art a conductivity probe and an associated circuit capable of giving highly reliable performance with a minimum of complexity, size or weight. The probe is particularly effective in providing for accurate conductivity readings free from interfering effects from the surrounding container or from objects within the liquid which are in proximity with the probe during measurements.

I claim as my invention:

1. Apparatus for monitoring the conductivity of a liquid comprising an oscillator producing a constant amplitude electrical signal;

an operational amplifier having an input terminal for receiving said signal, an output terminal, and a feedback network between said input and output terminals which determines the gain of said amplifier and the voltage level at said output terminal;

a probe for insertion into said liquid comprising in combination, (a) a probe housing, (b) a spaced-apart pair of electrodes and temperature sensing elements within said housing and in thermal proximity to said liquid, (c) insulating means for holding said electrodes and said temperature sensing elements, said insulating means being shaped to include (i) a first cut-away portion which defines a substantially closed channel between said electrodes and (ii) a second cut-away portion which intersects said channel and defines entry and exit conduits which provide paths for the entry of said liquid into said channel and the exit of air from said channel upon insertion of said probe into said liquid, each of said conduits intersecting said channel at a point having the same electrical potential with respect to said electrodes as the electrical potential of every other point of conduit intersection into said channel, and (d) electrical leads extending from said housing and connecting said electrodes and said temperature sensing elements respectively to said output terminal and into said feedback network of said operational amplifier such that said electrodes are maintained at a potential difference to the voltage at said amplifier output terminal and said voltage varies with the temperature of said liquid; and current sensing means in series with said electrodes for indicating the electrical conductivity of said liquid.

2. Apparatus according to claim 1 wherein said temperature sensing elements have resistance characteristics varying inversely to changes in temperature and said feedback network provides degenerative feedback, whereby the voltage at said output terminal of the amplifier varies inversely to the variations in the current carrying capabilities of said liquid during temperature changes.

3. A probe for use in monitoring the electrical conductivity of a liquid comprising in combination, a pair of electrodes maintained at different electrical potentials, and insulating means for holding said electrodes in spaced-apart relation to each other, said insulating means being shaped to include a. a first cut-away portion which defines a substantially closed channel between said electrodes and b. a second cut-away portion which intersects said channel and defines entry and exit conduits which provide paths for the entry of said liquid into said channel and the exit of air from said channel upon insertion of said probe into said liquid, each of said conduits intersecting said channel at a point having the same electrical potential with respect to said electrodes as the electrical potential of every other point of conduit intersection into said channel, whereby electrical conduction through said conduits to the liquid outside of said channel is prevented.

4. A probe for use in monitoring the electrical conductivity of a liquid as set forth in claim 3 further including a temperature compensating network operatively associated with said electrodes and effective to vary said electrical potential between said electrodes to make electrical conduction between said electrodes constant for said liquid irrespective of the temperature of said liquid.

5. A probe for use in monitoring the electrical conductivity of a liquid as set forth in claim 4 wherein said temperature compensating network includes temperature sensitive means and wherein said insulating means is further shaped to include a cut-away portion which defines a conduit for holding said temperature sensitive means in thermal proximity with said liquid.

6. In a probe for use in monitoring the conductivity of a liquid, the combination comprising:

a pair of electrodes maintained at different electrical potentials, insulating means for holding said electrodes in spaced-apart relationship to each other, said insulating means being shaped to include a. first and second cut-away portions respectively defining a pair of substantially closed channels between said electrodes for creating a pair of conduction paths between said electrodes when said channels are filled with said liquid, b. third and fourth cut-away portions respectively defining an entry conduit into each of said channels for allowing said liquid into said channels upon immersion of said probe into said liquid and c. fifth and sixth cut-away portions respectively defining an exit conduit from each of said channels for allowing air to escape said channel as said liquid enters said channel, each of said entry and exit conduits intersecting said channels at a point equidistant from said electrodes such that the points of intersection with said respective channels are at equal electrical potentials, whereby conduction through said ports into liquid outside of said channels is prevented.

7. In a probe for use in monitoring the conductivity of a liquid as set forth in claim 6 wherein said channels are disposed substantially parallel to the level of said liquid when said probe is immersed in said liquid and whereby the upper surfaces of said channels are inclined upwardly from said electrodes to said exit conduits to facilitate said escape of air from said channels.

* * * * *